United States Patent [19]

Conforti

[11] Patent Number: 4,460,863

[45] Date of Patent: Jul. 17, 1984

[54] BATTERY CHARGING FLASHLIGHT CIRCUIT

[75] Inventor: Frederick J. Conforti, Aurora, Ill.

[73] Assignee: Pittway Corporation, Aurora, Ill.

[21] Appl. No.: 407,719

[22] Filed: Aug. 13, 1982

[51] Int. Cl.³ ............................................... H02J 7/00
[52] U.S. Cl. ............................................. 320/59; 320/22
[58] Field of Search .................... 320/2, 5, 8, 22, 27, 320/48, 57, 59; 307/146; 323/231; 363/69, 70, 126

[56] References Cited

U.S. PATENT DOCUMENTS

| | | | |
|---|---|---|---|
| 3,327,198 | 6/1967 | Rauch | 320/48 X |
| 3,356,928 | 12/1967 | Parrish | 363/70 |
| 3,413,537 | 11/1968 | Sharp et al. | 320/27 |
| 3,736,490 | 5/1973 | Fallon et al. | 320/59 X |
| 4,177,413 | 12/1979 | Ascoli | 320/48 X |
| 4,281,278 | 7/1981 | Bilsky et al. | 320/13 |
| 4,323,960 | 4/1982 | Jones | 363/70 X |

OTHER PUBLICATIONS

"Battery Application Manual", Gates Energy Products, Inc., pp. 39–48, 1980.

*Primary Examiner*—William M. Shoop
*Attorney, Agent, or Firm*—Emrich & Dithmar

[57] ABSTRACT

A flashlight has a built-in passive battery charging circuit adapted to be plugged into an associated AC source, and a selector switch for selectively connecting the battery to the charging circuit or to the flashlight lamp. The charging circuit includes a transformer with a center-tapped secondary providing a high voltage at one set of terminals and a low voltage at another set of terminals. The high voltage is rectified by an LED and applied through a current-limiting resistor to the selector switch. The low voltage is full-wave rectified by a diode bridge, the output terminals of which are coupled to the selector switch. Also connected across the output terminals of the diode bridge is a Zener diode circuit for terminating current flow from the bridge to the battery when the battery voltage reaches a predetermined level.

14 Claims, 2 Drawing Figures

BATTERY CHARGING FLASHLIGHT CIRCUIT

BACKGROUND OF THE INVENTION

The present invention relates to battery charging circuits and, in particular, to circuits for charging rechargeable batteries such as lead-acid batteries, particularly those used in small flashlights and other portable devices.

Battery manufacturers specify the charging characteristics which are desirable for the most effective charging of a particular type of battery. The recommended charging curve for any lead-acid battery is a relatively high constant current at a specified voltage until the battery is fully charged followed by a rapid decrease to a low constant current which will permit the battery to be "float" charged indefinitely without damage. The present invention has particular application to chargers which will provide such a two-step charging characteristic with a specified voltage during the high-current period which has been found to offer the most desirable characteristics for battery life and recharge performance.

Two-step constant current charging circuits are known. They operate to charge the battery at a relatively high rate until it has reached a predetermined charge level, at which point it drops to a low "trickle" charge rate that maintains the desired charge level indefinitely without excessive overcharging of the battery. However, such known charging circuits are of complex design and utilize expensive active components.

SUMMARY OF THE INVENTION

The present invention relates to an improved battery charging circuit which avoids the disadvantages of prior battery charging circuits while affording additional structural and operating advantages.

It is a general object of this invention to provide a two-step constant current battery charger which is of extremely simple and economical construction.

In connection with the foregoing object, it is another object of this invention to provide a battery charging circuit of the type set forth which utilizes no active components.

Yet another object of this invention is the provision of a battery charging circuit of the type set forth which provides two separate AC voltage levels which are separately rectified for providing two different levels of voltage and charging current.

In connection with the foregoing object, it is another object of this invention to provide a flashlight circuit which includes a battery charging circuit of the type set forth.

These and other objects of the invention are attained by providing a battery charging circuit comprising a transformer having a primary adapted to be coupled to an associated source of AC voltage and first and second secondary portions respectively providing relatively high and relatively low output voltages, first rectifying means connected to the first secondary portion for rectifying the relatively high output voltage thereof, current limiting means connected to the first rectifying means and adapted to be connected to the associated battery for limiting the current supplied thereto from the first rectifying means, second rectifying means connected in circuit with the second secondary portion for rectifying the relatively low output voltage thereof, and switch means connected to the output of the second rectifying means and adapted to be coupled to the associated battery and responsive to the battery voltage, the switch means allowing current from the second rectifying means to flow to the battery when the battery voltage is below a predetermined voltage and preventing flow of current from the second rectifying means to the battery when the battery voltage is equal to or greater than the predetermined voltage.

The invention consists of certain novel features and a combination of parts hereinafter fully described, illustrated in the accompanying drawings, and particularly pointed out in the appended claims, it being understood that various changes in the details may be made without departing from the spirit or sacrificing any of the advantages of the invention.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENTS

Figure 1:
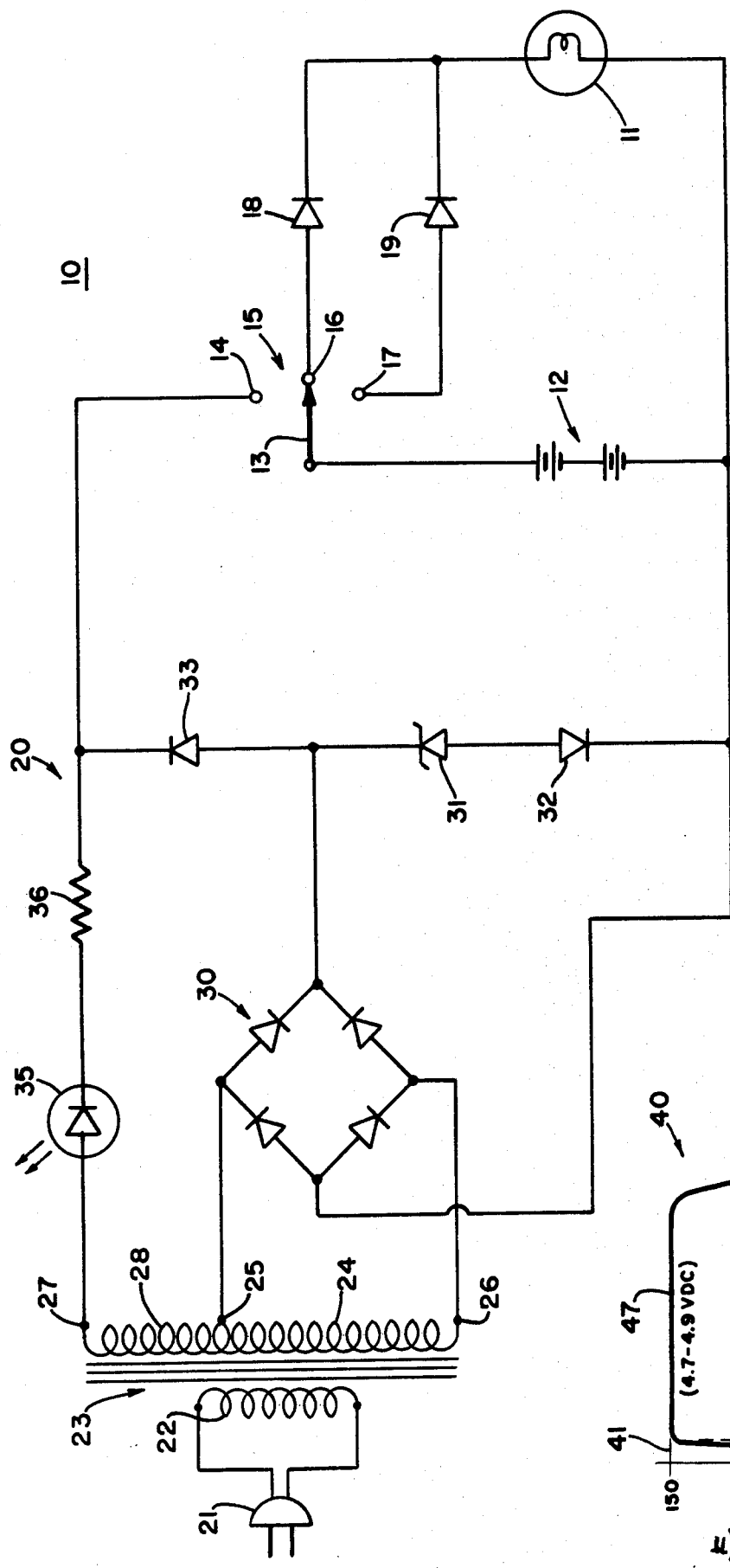
FIG. 1 is a schematic circuit diagram of a battery charging flashlight circuit constructed in accordance with and embodying the features of the present invention.

Referring to FIG. 1 there is illustrated a flashlight circuit, generally designated by the numeral 10, which includes a lamp 11 and is adapted to be powered by a battery 12, two series-connected battery cells being illustrated in the drawing. It will, however, be appreciated that any desired number of battery cells could be used. The cells of the battery 12 are of the rechargeable type, and are preferably of the lead-acid variety, such as those manufactured by Gates Energy Products, Inc. under model No. 0810-0004, "D" CELL. However, it will be appreciated that the present invention may be adapted for use with other types of rechargeable batteries.

The anode of the battery 12 is connected to the wiper 13 of a three-position selector switch, generally designated by the numeral 15, which has fixed contacts 14, 16 and 17. The fixed contact 16 is connected through a diode 18 to one terminal of the lamp 11 and the fixed contact 17 is connected through another diode 19 to the same lamp terminal. The other terminal of the lamp 11 is connected to the cathode of the battery 12. The diode 18 is selected to give a greater forward voltage drop than the diode 19. For example, the diode 18 may be a standard rectifier diode while the diode 19 may be a Schottky barrier diode. Thus, a lower voltage will be supplied from the battery 12 to the lamp 11 when the wiper 13 is connected to the fixed contact 16, than when it is connected to the fixed contact 17, so that the latter position of the selector switch 15 will provide a brighter light output from the lamp 11. Alternatively, diode 19 could be replaced with a short circuit to give an even brighter output.

When the wiper 13 is connected to the fixed contact 14, the battery 12 is disconnected from the lamp 11 and is connected to a charging circuit, generally designated by the numeral 20. Thus, this position of the selector switch 15 may be referred to as the charging position, while the other two positions are operating positions. Thus, the lamp 11 cannot be on during charging of the battery 12. The charging circuit 20 includes a plug 21 adapted to plug into a standard receptacle of a 120 VAC source. The plug 21 is connected across the primary winding 22 of a step-down voltage transformer 23 which has a center-tapped secondary. More specifically, the transformer 23 has a secondary winding 24 provided with terminals 25 and 26. Connected between the terminal 25 and a terminal 27 is another secondary winding 28. The transformer 23 is preferably designed to have poor voltage regulation and produces between the terminals 25 and 26 a relatively low voltage and produces between the terminals 25 and 27 a relatively high voltage. The secondary winding 24 is designed to supply a higher current than the secondary winding 28 and, therefore, may be a heavier winding. More particularly, the secondary winding 24 may, for example, be designed to supply approximately 150 ma.

Connected across the secondary winding 24 is a diode bridge rectifier, generally designated by the numeral 30, one of the output terminals of which is connected to the cathode of the battery 12. Connected back to back across the output terminals of the diode bridge 30 are a Zener diode 31 and a diode 32, with their cathodes respectively connected to the output terminals of the diode bridge 30. The terminal 27 of the transformer 23 is connected to the anode of an LED 35, the cathode of which is connected through a current-limiting resistor 36 to the fixed contact 14 of the selector switch 15. The fixed contact 14 is also connected to the cathode of a diode 33, the anode of which is connected to the cathode of the Zener diode 31.

In operation, the LED 35 half-wave rectifies the voltage across the secondary windings 28 and 24 and supplies current to the battery 12 through the resistor 36 and the fixed contact 14 and wiper 13 of the selector switch 15. This current is limited to about 10 ma average by the current-limiting resistor 36. This "trickle" current is always supplied to the battery 12 when the charging circuit 20 is plugged into an AC source and the selector switch 15 is in it charging position. This is a significant aspect of the present invention, since the secondary windings 28 and 24, the LED 35 and the resistor 36 cooperate continuously to provide to the battery 12 a relatively high voltage with limited current. It is essential that a substantially dead battery see such a high voltage to start the chemical charging process if it is ever to be revived, the requirement to stimulate a dead lead-acid battery being a source voltage in excess of about 8 volts. It is necessary that the current be limited to about 10 ma so that it can be used as a "trickle" current to "float" charge the battery.

The voltage across the secondary winding 24 is full-wave rectified by the bridge rectifier 30, and this rectified voltage is then applied across the Zener diode 31 and diode 32 which clamp the peak voltage to a value less than that which the transformer 23 is capable of delivering. The Zener voltage is selected to be approximately the same as the specified voltage required for fully charging the battery 12 without overcharging, since overcharging will shorten the battery 12 life. Thus, when the battery voltage is below that predetermined specified voltage, all of the relatively high current from the bridge rectifier 30 will flow to the battery 12. When the battery voltage reaches the predetermined voltage the diode 33 will become back-biased and the Zener diode 31 will start conducting, so that the current from the rectifying bridge 30 will no longer flow to the battery 12 but will flow through the Zener diode 31 and diode 32. Thus, the Zener diode 31 and the diode 33 effectively serve as an electronic switch which stops providing charging current to the battery 12 once it is charged to a predetermined voltage. The diode 32 is optional and is provided solely to reduce overpowering of the Zener diode 31.

The diode 33 is provided to prevent the battery 12 from discharging back through the Zener diode 31 if the selector switch 15 is left in the charging position after the charging circuit 20 is unplugged from the AC source. It will be appreciated that even after the Zener diode 31 starts conducting, the battery 12 is still being charged from the low current source provided by the secondary winding 28 and LED 35 through the resistor 36. This tends to pull the battery terminal voltage above the specified full-charge voltage, but with a very limited current. Thus, the diode 33 becomes back biased, thereby forcing the current from the high current source, which is the bridge rectifier 30, to be delivered through the Zener diode 31.

It is a significant aspect of the present invention that the LED 35 has two purposes, first to rectify the voltage from the secondary winding 28 and secondly to provide a light indication that the charging circuit 20 is plugged into the AC source and that the selector switch 15 is in its charging position, which indicates that the battery 12 is being charged.

Figure 2:
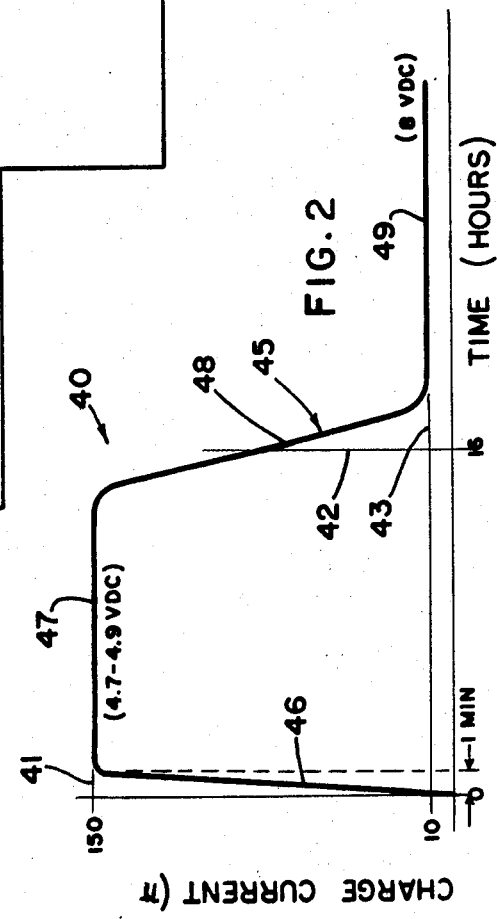
FIG. 2 is a graph of the charging current characteristic produced by the circuit of FIG. 1.

Referring to FIG. 2, the ideal charging characteristic curve for the battery 12 as recommended by the manufacturer is represented generally by the numeral 40, and includes a constant high-current portion 41 which continues until the battery has reached its predetermined full-charged voltage, and then a drop 42 to a constant low current 43 which is utilized to "float" charge the battery 12 for an indefinite period of time. Also illustrated in FIG. 2 by heavy line, generally designated by the numeral 45, is the actual charging characteristic produced by the charging circuit 20 of FIG. 1. When the charging circuit 20 is plugged into the associated AC source and is initially connected to the battery 12, the charging current will initially rise steeply at 46 from 0 to a high charging current of approximately 150 ma at 47, the rise time being in the order of about one minute. This assumes a dead battery. It will be appreciated that this initial portion of the characteristic curve 45 will vary depending upon the actual discharge level of the battery 12 when the charging circuit 20 is first connected thereto. The battery manufacturer specifies a charging voltage for the battery. Thus, for a cell rated at 2 volts, the charging voltage may be 2.35 to 2.45 volts. That voltage should not be exceeded during charging, otherwise the battery life will be shortened. Thus, for example, with the 2-cell battery 12, assuming 2-volt cells, the high current portion 47 of the charging characteristic, the voltage is maintained at a maximum level of about 4.7 to 4.9 VDC, this regulation being provided by the Zener diode 31. When the terminal voltage of the battery 12 approaches its specified full-charge value the charging current characteristic rapidly drops off, as at 48, to the limited trickle charge current of approximately 10 ma provided by the current limiting resistor 36, this portion of the charge curve being designated 49.

In FIG. 2 the full-charge value has been reached at approximately 16 hours. However, it will be appreciated that any desired charging rate could be utilized. The battery manufacturer simply specifies a charging current which cannot be exceeded which may, for example, be 10 amps. In the preferred embodiment there has been illustrated a charging rate of 150 ma for about 16 hours so as to provide a full charge overnight. However, a more rapid charging rate could have been selected by providing a higher charging current, but this would require a larger transformer.

In a constructional model of the present invention the transformer secondary winding 24 provides approximately 8 VAC and approximately 150 ma, while the transformer secondary windings 28 and 24 provides approximately 16 VAC. The breakdown voltage of the Zener diode 31 is approximately 4.8 volts so that the charging circuit 20 is adapted for charging two battery cells in series, each being rated at 2 volts, with a charging voltage of 2.35 to 2.45 volts. However, it will be appreciated that the charging circuit 20 could be adapted for charging other sizes and types of batteries and the component values would be selected accordingly, depending upon the charging rate desired.

From the foregoing, it can be seen that there has been provided an improved battery charging circuit which is of extremely simple and economical construction providing for two-step constant current charging of rechargeable batteries and regulated voltage in the higher current mode without the use of any active circuit elements. There has also been provided a unique flashlight circuit having built thereinto the charging circuit of the present invention.

I claim:

1. A passive two-step battery charging circuit comprising a transformer having a primary adapted to be coupled to an associated source of AC voltage and a tapped secondary, said secondary providing a relatively high output voltage and having a portion for providing a relatively low output voltage, first rectifying means connected to said secondary for rectifying the relatively high output voltage thereof, current limiting means connected to said first rectifying means and adapted to be connected to the associated battery for limiting the current supplied thereto from said first rectifying means, second rectifying means connected in circuit with said secondary portion for rectifying the relatively low output voltage thereof, and passive switch means connected to the output of said second rectifying means and adapted to be coupled to the associated battery and responsive to the battery voltage, said switch means allowing a high current from said second rectifying means to flow to the battery when the battery voltage is below a predetermined voltage and preventing flow of current from said second rectifying means to the battery when the battery voltage is equal to or greater than said predetermined voltage.

2. The battery charging circuit of claim 1, wherein said first rectifying means is a half-wave rectifier.

3. The battery charging circuit of claim 1, wherein said first rectifying means is a light-emitting diode.

4. The battery charging circuit of claim 1, wherein said second rectifying means is a full-wave rectifier.

5. The battery charging circuit of claim 1, wherein said second rectifying means comprises a diode bridge.

6. The battery charging circuit of claim 1 wherein said switch means includes unidirectional current means connected between said second rectifying means and the associated battery for preventing current flow from the battery to said second rectifying means.

7. The battery charging circuit of claim 6, wherein said switch means further includes a Zener diode coupled to said second rectifying means for regulating said relatively low output voltage.

8. A passive two-step battery charging flashlight circuit for use with rechargeable batteries, said flashlight circuit comprising a lamp; a charging circuit; and selector switch means adapted for connection to the associated battery and having an operating condition for connecting said lamp to the battery and a charging condition for connecting said charging circuit to the battery; said charging circuit including a transformer having a primary adapted to be coupled to an associated source of AC voltage and a tapped secondary, said secondary providing a relatively high output voltage and having a portion for providing a relatively low output voltage, first rectifying means connected to said secondary for rectifying the relatively high output voltage thereof, current limiting means connected in series between said first rectifying means and said selector switch means, second rectifying means connected in circuit with said secondary portion for rectifying the relatively low output voltage thereof, and passive electronic switch means connected to the output of said second rectifying means and coupled to said selector switch means and being responsive to the battery voltage when said selector switch means is in its charging condition, said electronic switch means allowing a high current from said second rectifying means to flow to the battery when the battery voltage is below a predetermined voltage and preventing flow of current from said second rectifying means to the battery when the battery voltage is equal to or greater than said predetermined voltage.

9. The battery charging flashlight circuit of claim 8, wherein said selector switch means has two operating conditions for connecting said lamp to the battery, and further including impedance means connected in series with said lamp when said selector switch means is disposed in at least one of said operating conditions thereof for applying different voltages to said lamp in said two operating conditions of said selector switch means.

10. The battery charging flashlight circuit of claim 9, wherein said impedance means is a diode.

11. The battery charging flashlight circuit of claim 8, wherein said first rectifying means comprises a light-emitting diode.

12. The battery charging flashlight circuit of claim 8, wherein said electronic switch means includes a diode connected between said second rectifying means and said selector switch means for preventing current flow from the associated battery to said second rectifying means.

13. The battery charging flashlight circuit of claim 8, and further including plug means connected to said transformer primary for connection thereof to the associated AC source.

14. A passive two-step battery charging circuit comprising input terminals adapted to be connected to an associated source of AC voltage and output terminals adapted to be connected to an associated battery, circuit means coupled to said input terminals for providing first and second AC voltages, first and second rectifying means coupled to said circuit means for respectively rectifying said first and second voltages, current limiting means connected to said first rectifying means and adapted to be connected to the associated battery for limiting the current supply thereto from said first rectifying means, and passive switch means connected to the output of said second rectifying means and adapted to be coupled to the associated battery and responsive to the battery voltage, said switch means allowing a high current from said second rectifying means to flow to the battery when the battery voltage is below a predetermined voltage and preventing flow of current from said second rectifying means when the battery voltage is equal to or greater than said predetermined voltage.

* * * * *